US005221476A

United States Patent [19]

Papetti et al.

[11] Patent Number: 5,221,476

[45] Date of Patent: Jun. 22, 1993

[54] HYDROCYCLONE CONDUITS

[75] Inventors: Richard R. Papetti, North Easton; James D. Livsey, Rochester; Ernest J. Charette, Taunton, all of Mass.

[73] Assignee: Bird Escher Wyss Inc., Mansfield, Mass.

[21] Appl. No.: 835,298

[22] Filed: Feb. 13, 1992

Related U.S. Application Data

[63] Continuation-in-part of Ser. No. 562,208, Jul. 31, 1990, Pat. No. 5,096,587.

[51] Int. Cl.[5] .................... B01D 21/26

[52] U.S. Cl. .................... 210/512.2; 210/512.1; 209/144; 209/211; 55/459.1

[58] Field of Search .................... 210/512.1, 512.2, 787; 209/144, 211; 55/459.1; 428/264

[56] References Cited

U.S. PATENT DOCUMENTS

| | | | |
|---|---|---|---|
| 3,057,476 | 10/1962 | Gilbert | 209/211 |
| 3,902,601 | 9/1975 | Townley | 209/144 |
| 3,940,331 | 2/1976 | Rastatter | 209/211 |
| 3,959,123 | 5/1976 | Wikdahl | 209/211 |
| 3,959,150 | 5/1976 | Frykhult et al. | 210/512 |
| 3,989,628 | 11/1976 | Bier | 210/255 |
| 4,019,980 | 4/1977 | Beery | 209/211 |
| 4,226,726 | 10/1980 | Rehm | 210/512 |
| 4,267,048 | 5/1981 | Ohisi | 210/512.2 |
| 4,375,365 | 3/1983 | Müller et al. | 55/346 |
| 4,375,366 | 3/1983 | Müller et al. | 55/416 |
| 4,389,307 | 6/1983 | Boadway | 209/211 |
| 4,407,663 | 10/1983 | Hawley | 55/347 |
| 4,608,174 | 8/1986 | Kokkonen et al. | 210/512.2 |
| 4,634,535 | 1/1987 | Lott | 210/512.2 |
| 4,737,287 | 4/1988 | Prendergast | 210/512.2 |
| 5,028,007 | 7/1991 | Wokal | 239/518 |

*Primary Examiner*—Mary Lynn Theisen
*Assistant Examiner*—David Reifsnyder
*Attorney, Agent, or Firm*—Fish & Richardson

[57] ABSTRACT

Hydrocyclone separators of the type used to separate contaminants from pulp suspensions in paper mills are connected to feed, accept, and reject conduits using a conduit apparatus in which both feed and accept portions can be made from smooth material. The feed and accept portions include surfaces through which apertures are provided for making connections to the feed and accept nozzles of the hydrocyclones. The smooth material eliminates the tendency of pulp to build up on the conduit walls and in the nozzles, thereby avoiding the problems that can occur when such build ups break loose. The nozzles of the hydrocyclones are preferably attached by placing a resilient sealing member around the circumference of the nozzle, and inserting the nozzle into an aperture formed in the wall of the conduit until the sealing member engages the inside wall of the aperture. The wall of the conduit can include a generally flat portion made from a metal plate material so that the sealing member seals only against the narrow, generally-cylindrical inside surface of the aperture. The wall can also be molded of a plastic material and can have an aperture dimensioned so that a length between the exterior and interior walls changes around the aperture. A manifold is also provided which is useable between the main feed and main accept conduits so that it can either be parallel therewith or transverse thereto.

36 Claims, 13 Drawing Sheets

HYDROCYCLONE CONDUITS

CROSS REFERENCE TO RELATED APPLICATION

This application is a continuation-in-part application of Ser. No. 07/562,208, now U.S. Pat. No. 5,096,587 filed Jul 31, 1990, the disclosure of which is incorporated herein by reference.

BACKGROUND OF THE INVENTION

This invention relates to hydrocyclone separators such as are typically used to remove contaminants from solid-liquid suspensions (e.g., pulp suspensions in paper mills).

Hydrocyclone separators are connected to feed, accept, and reject conduits. The hydrocyclones are typically sealed to the conduit, to prevent leakage of liquid. The connections between the hydrocyclones and the conduits should be easy to remove and replace to allow for cleaning, monitoring, repair, and replacement of the hydrocyclones.

One prior art approach to making these connections is to use flexible hoses and hose clamps to connect the ends of small diameter pipes welded to cylindrical conduits and corresponding small diameter nozzles projecting from the hydrocyclones.

Another approach is described in U.S. Pat. No. 3,959,150 to Frykhult. Small diameter pipes on cylindrical conduits mate telescopically with smaller diameter nozzles on the hydrocyclones. The pipes on the conduits are sized so that the nozzles fit inside of the pipes in sealing engagement. An o-ring placed around the nozzle before insertion engages the interior of the pipes and prevents leakage.

It is also known that various materials can be utilized for making the connections to and from the hydrocyclones. Typically these connections are made of metal tubing or piping which is expensive and usually must be custom built. The metal connections are also very heavy and this fact must be taken into account when designing and installing the system.

Often a large number of components must be welded together to assemble a unit. Each weld is labor intensive and is also a potential leak path. Metal conduits are heavy and must be built manually, thereby increasing the expense of the apparatus. Other materials have typically not been used in fabricating the main conduits because metal, and especially stainless steel, has been thought to provide the best characteristics.

SUMMARY OF THE INVENTION

In one aspect the invention features attaching the nozzles of a hydrocyclone to their respective conduits by placing resilient sealing members around the circumference of the nozzles, and inserting the nozzles into apertures formed in the wall of the conduit apparatus, such that the sealing member engages a cylindrical sealing portion of the aperture. The invention provides an improved and simpler to manufacture seal between the conduit and the hydrocyclones. It does not require hoses, which are prone to failure, and eliminates the use of telescoping sealing members which are more complex and expensive to manufacture (e.g., because of the difficulty associated with holding adequately tight tolerances while welding the necessary tubes to the conduit), and which are susceptible to damage. Also, it eliminates the added roughness caused by welding the telescoping members onto the conduits, and therefore reduces the buildup of solids in that area.

Another aspect of the invention features a molded polymeric manifold for connecting a plurality of hydrocyclones to feed and accept conduits. The molded polymeric manifold comprises a molded feed portion defining a feed cavity configured to transport feed materials from the feed conduit to the plurality of hydrocyclones. The feed cavity includes an inlet and a plurality of outlets. The molded manifold also includes a molded accept portion defining an accept cavity configured to transport accept materials from the plurality of hydrocyclones to the accept conduits. The accept cavity includes a plurality of inlets and an outlet. The feed cavity and/or the accept cavity may have a cross-sectional area that varies along their respective lengths.

It is preferred that the molded manifold be formed of plastic and preferably of glass reinforced nylon which has excellent strength, durability and wear properties.

Another aspect of the present invention includes an apparatus for separating material which can employ either the molded manifold or a non-molded manifold. This apparatus can be in the configuration of a branched design where the manifolds are transversely disposed relative to the main feed and main accept conduits or it can be of an "in-line" configuration where the manifolds are disposed parallel to the longitudinal axes of the main feed and accept conduits. With the in-line configuration, two molded manifolds can be attached to each other so that the feed cavities of each are matched up together and the accept cavities of each are also matched up.

Other advantages of the invention include reducing the floor space required for the assembly of conduits and hydrocyclones, and providing easier maintenance, repair, and replacement of the hydrocyclones. The molded manifolds also provide a structure which is reduced in weight, inexpensive to manufacture, and which eliminates many potential leak locations by limiting the number of welded connection points. Further, a tapered cavity in the manifold provides a more constant fluid velocity which improves performance. The round cross section results in a reduction in the operating stress in the manifold walls as compared to non-round cross sections The present design is also designed for easy shipment, as the overall size and weight of the apparatus has been reduced.

These and other features and advantages of the invention will be apparent from the following description of the preferred embodiments, and from the claims.

DETAILED DESCRIPTION OF THE PREFERRED EMBODIMENTS

Figure 1:
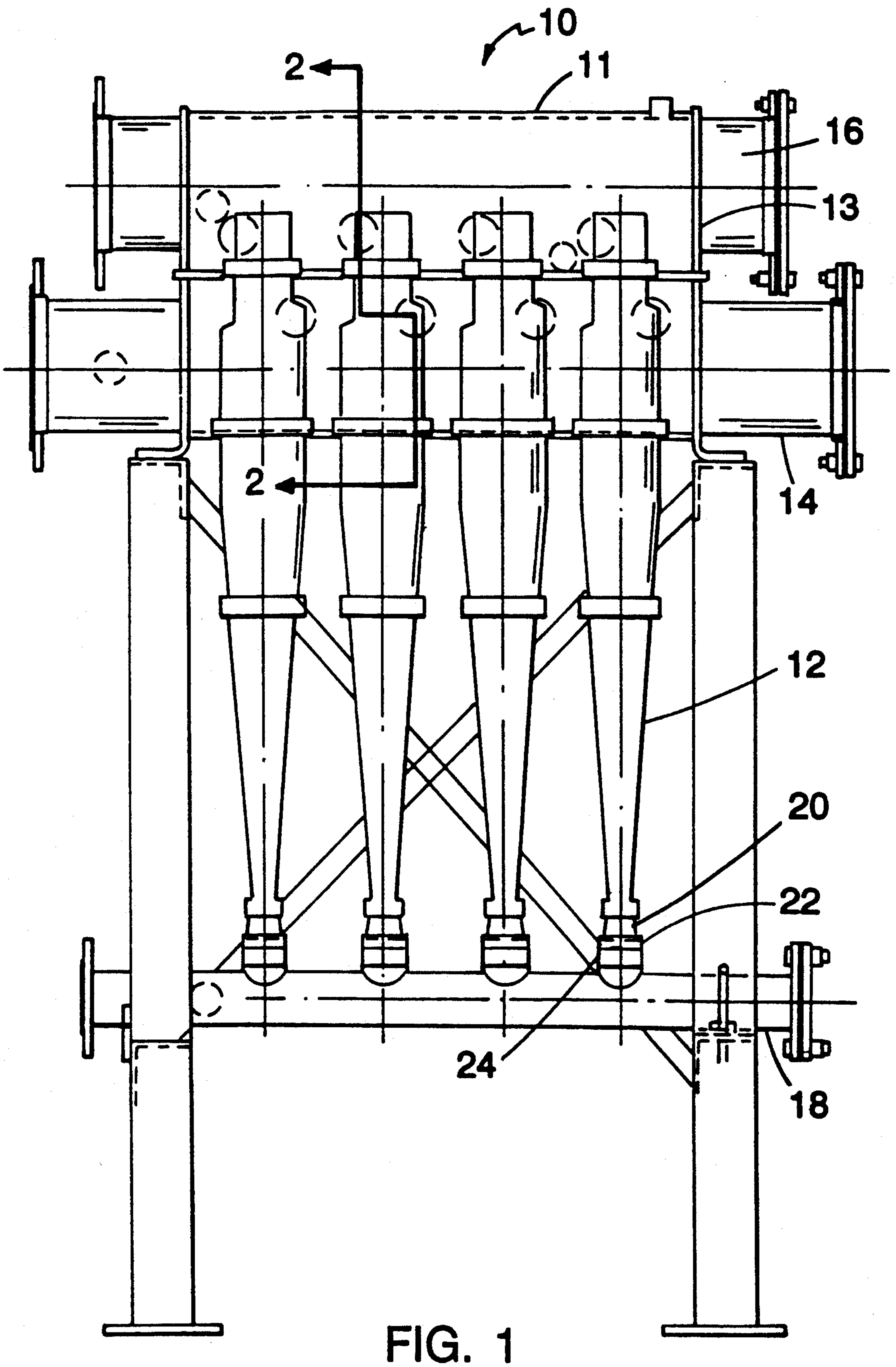
FIG. 1 is an elevation view of a conduit apparatus according to a first embodiment of the present invention

Referring now to FIG. 1, a hydrocyclone arrangement 10 includes eight hydrocyclones 12 attached to a feed/accept conduit 11 having two end plates 13. In this embodiment, the hydrocyclones are arranged with four on each side (four are not shown). A feed conduit 14 transports a liquid-solid suspension, i.e. pulp stock, to the hydrocyclone arrangement, while an accept conduit 16 receives the acceptable portion of the suspension and conducts it to the next processing station. A reject conduit 18 removes the unacceptable portion. The feed conduit and the accept conduit are attached to the end plates of the hydrocyclone arrangement via welding.

A telescoping nozzle is utilized to attach the hydrocyclone to the reject conduit 18. More specifically, the nozzle includes an inner pipe 20, attached to the hydrocyclone in an axial orientation to the hydrocyclone, which has a groove located around the circumference of the pipe 20 adapted to maintain an o-ring 22 therein. The reject conduit 18 includes a nozzle connection 24 which includes an outer pipe of a relatively larger diameter than that on the hydrocyclone. The inner pipe fits inside of the outer pipe with sufficient clearance to allow for the hydrocyclone to pivot in any direction, and the o-ring forms a seal between the two pipes when the hydrocyclone is in a proper position. The means of attachment of the feed and accept conduits to the hydrocyclones is described below.

Figure 2:
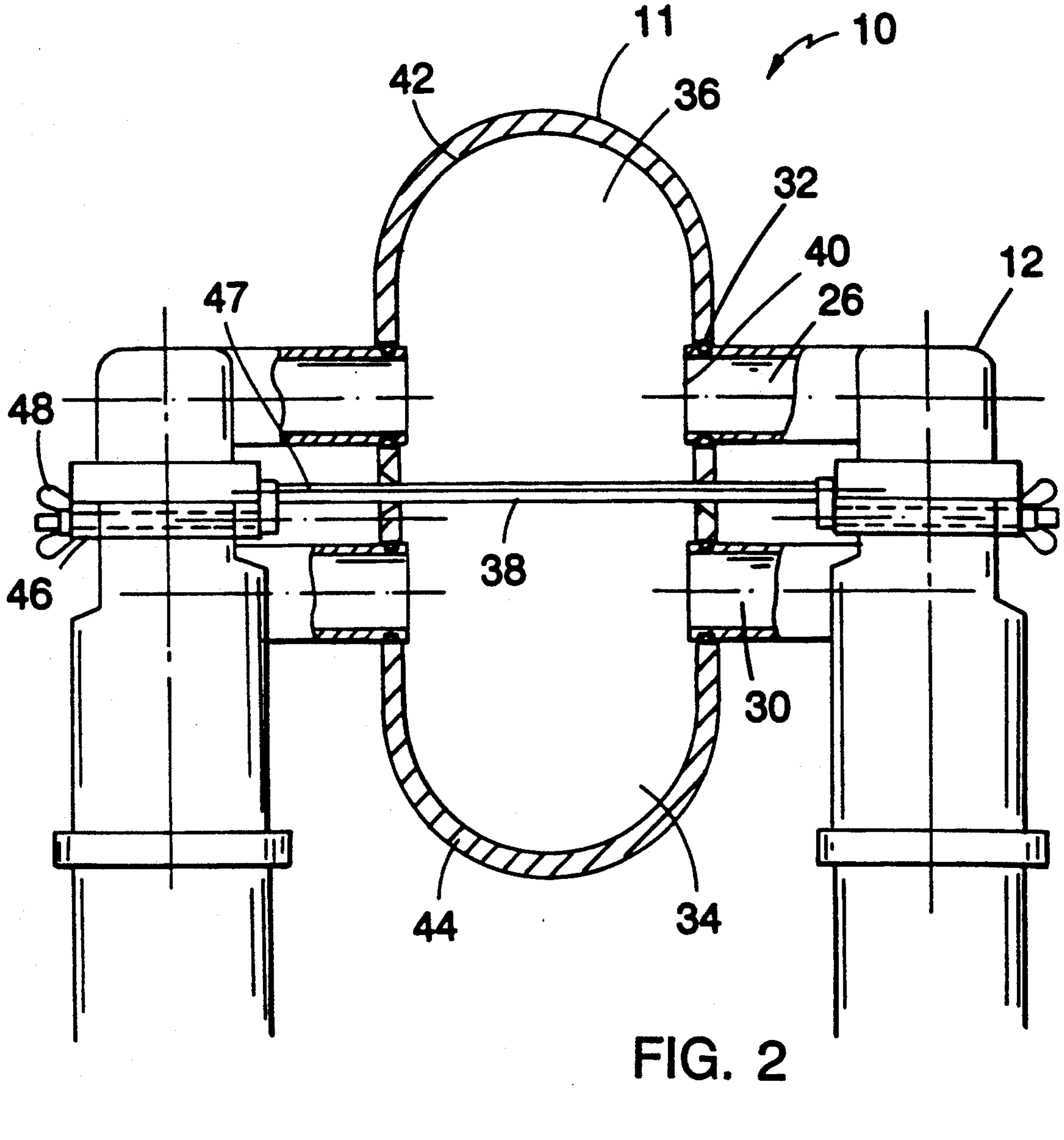
FIG. 2 is a partial cross-sectional view taken at section line 2—2 of FIG. 1.

FIG. 2 is an illustration of the top portion of a hydrocyclone arrangement 10 of the invention. Hydrocyclones 12 are attached to both sides of the feed/accept conduit 11. Each hydrocyclone 12 includes two nozzles 26, 30 which are oriented orthogonally to the axis of the hydrocyclone and are adapted for attachment onto the feed/accept conduit 11. Each nozzle includes a groove located around the circumference of the nozzle adapted to maintain an o-ring member 32. The feed/accept conduit 1; includes two compartments, a feed compartment 34 and an accept compartment 36. These two compartments are separated by a partition 38. The feed/accept conduit 11 has two U-shaped sections in a face-to-face orientation so that they form a closed surface having two generally flat sides. These generally flat sides must be flat enough to provide a cylindrical sealing area of sufficient size to maintain an o-ring in sealing engagement with the wall of the feed/accept conduit, however, they need not be perfectly flat. Conduit apertures 40, provided on these flat surfaces, are adapted to receive the hydrocyclone nozzles 26, 30. The o-ring member provides sealing between the feed/accept conduit and the hydrocyclone.

The dimensions for the feed/accept conduit are described below. Note that these dimensions are specific to a feed/accept conduit designed to accommodate eight hydrocyclones, and that the dimensions will vary for differing arrangements. The feed/accept conduit is approximately 4 feet in length, 20 inches high, and 8 inches wide. The feed/accept conduit 11 is manufactured from three sheets of ½ inch thick stainless steel plate. Two of these sheets 42, 44 are 24 inches by 48 inches on a side and are each formed into a U-shape, while the third sheet 47 is 16 inches by 48 inches on a side and is maintained flat. This flat sheet acts as the partition dividing the feed compartment and the accept compartment (described above) and also as a support for the hydrocyclones in the arrangement. This flat sheet is 8 inches wide in the interior of the conduit and extends 4 inches on each side of the outer feed/accept conduit wall. Attached to the ends of this flat sheet are split clamps 46 which, when closed, surround the circumference of the hydrocyclone and are secured by threaded bolt and nut combinations 48.

The method of attaching the hydrocyclones 12 to the feed/accept conduit 11 includes the following steps. An o-ring is placed in each of the grooves contained on each of the hydrocyclone nozzles. The axially oriented nozzle 20 is placed within the outer tube 24 of the reject conduit 18 and the hydrocyclone is oriented so that the orthogonally oriented nozzles 26, 30 are in a face-to-face relationship with the conduit apertures 40. Sufficient clearance is provided between the nozzle 20 and the outer pipe 24 to allow the hydrocyclone to pivot about that point, but still maintain a sealing engagement. The orthogonally oriented nozzles are tiled slightly toward and into the conduit apertures until each of the o-ring sealing members is positioned so that it seals against the cylindrical sealing area of the wall of the aperture in the feed/accept conduit. The hydrocyclones are then secured to the assembly via the split clamp and nut/bolt combination.

Figure 3:
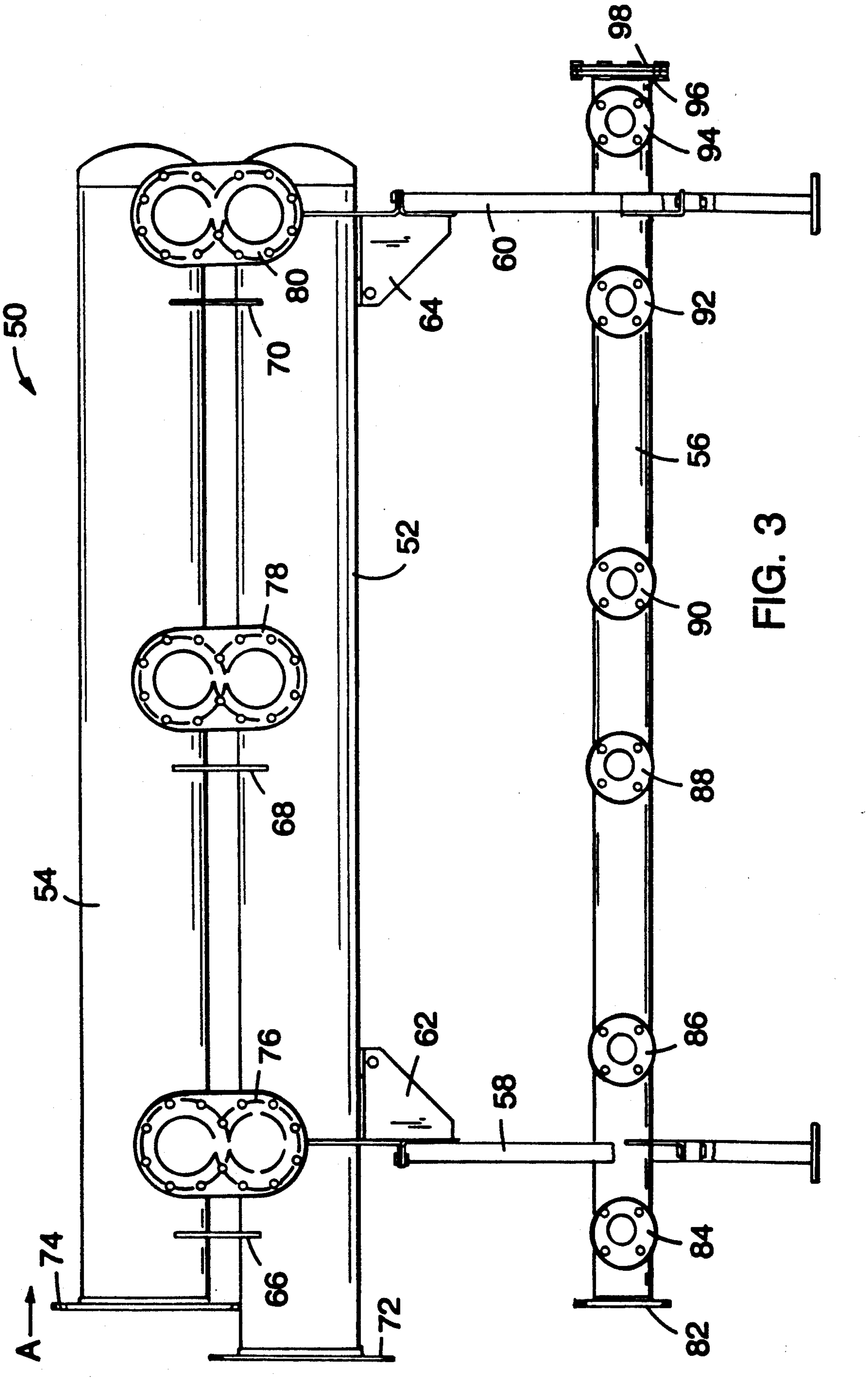
FIG. 3 is a side elevational view of a frame and a main portion of a conduit apparatus shown without the molded manifolds being attached thereto according to a second embodiment of the present invention.
Figure 4:
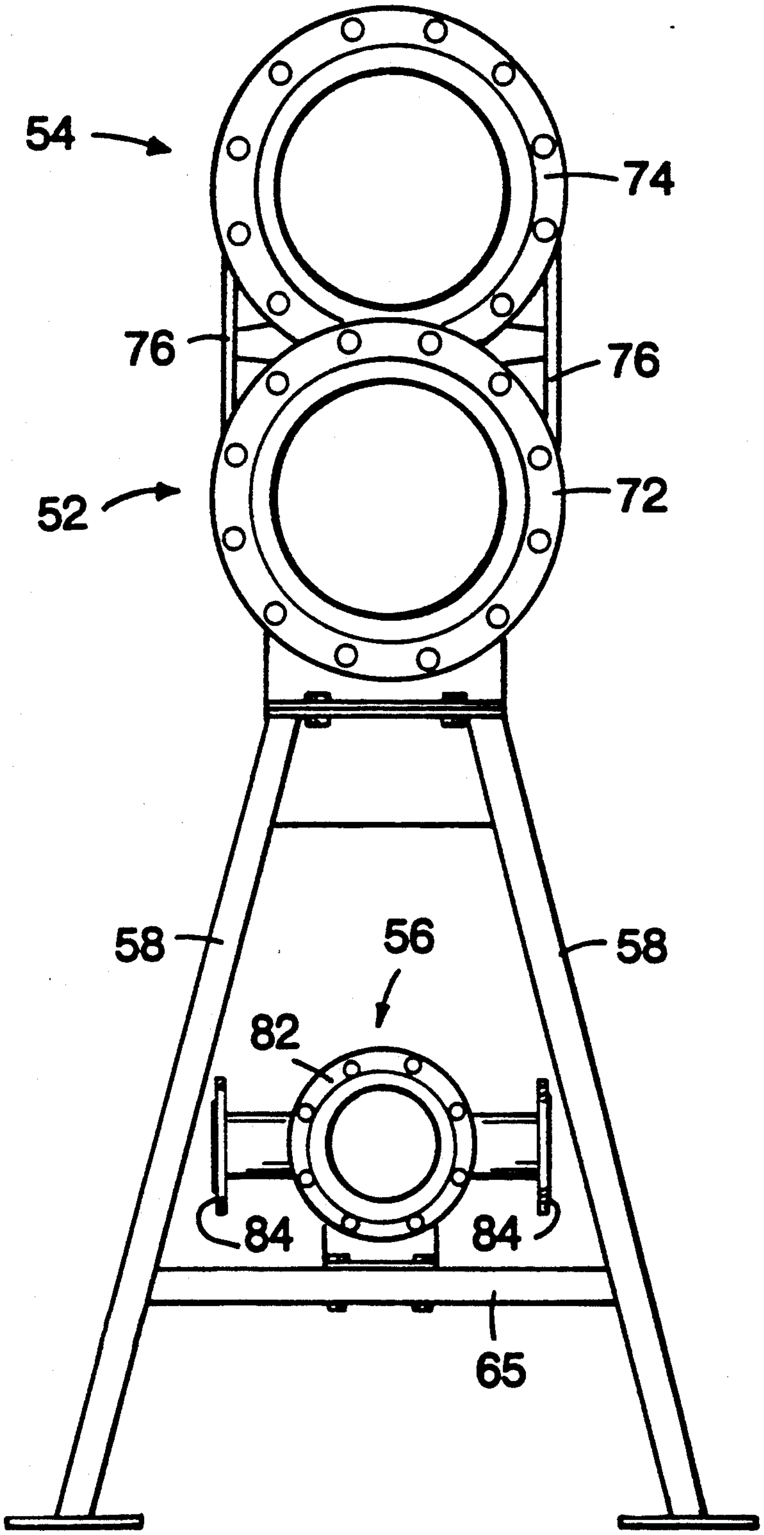
FIG. 4 is an end view of FIG. 3 taken in the direction of arrow A, illustrating the main feed, main accept and main reject conduits attached to the frame.

Referring to FIG. 3, a main portion of a conduit apparatus 50 is shown according to a second embodimetn of the present invention. FIG. 3 illustrates a main feed conduit 52, a main accept conduit 54, and main reject conduit 56 which are all disposed on a frame. The frame as shown includes frame members 58 and 60 which are the vertical supports that spatially separate the conduits a distance which is sufficient for allowing a plurality of hydrocyclones to be arranged adjacent thereto. The frame includes gussets 62 and 64 which stiffen the structure. As can be seen in FIG. 4, the frame also includes a cross piece 65 onto which is attached the main reject conduit 56 via bolts. The main feed conduit 52 and main accept conduit 54 are separated by supports 66, 68 and 70 which hold main accept conduit 54 in the proper orientation relative to the main feed conduit.

The main feed conduit 52 includes a flange 72 which is adapted to mate with the other conduits which connect to the pumps that supply the material to be separated. The main accept conduit 54 includes a similar flange 74 for connecting to conduits that will deliver the acceptable separated material to its next location.

The main feed conduit 52 and the main accept conduit 54 each include connections to a plurality of connecting flanges 76, 78 and 80. These connecting flanges are for attaching the manifolds which feed the hydrocyclones as will be described below. As can be seen from FIG. 4, these connecting flanges are disposed on both sides of the main feed and accept conduits 52, 54.

The main reject conduit 56 includes a flange 82 for connecting to conduits which will deliver the rejected and separated materials to a predetermined location. The main reject conduit 56 also includes a plurality of connecting flanges 84, 86, 88, 90, 92 and 94 which are adapted to receive the molded reject conduits which will be further described below. The main reject conduit 56 also includes an additional flange 96 at the opposite end of flange 82 which is shown to have a plate 98 bolted thereto. This arrangement allows the user to remove plate 98 and thoroughly clean the main reject conduit 56 periodically. Likewise it is possible to provide an additional flange and plate bolted thereto for the main feed and accept conduits 52 and 54.

Figure 5:
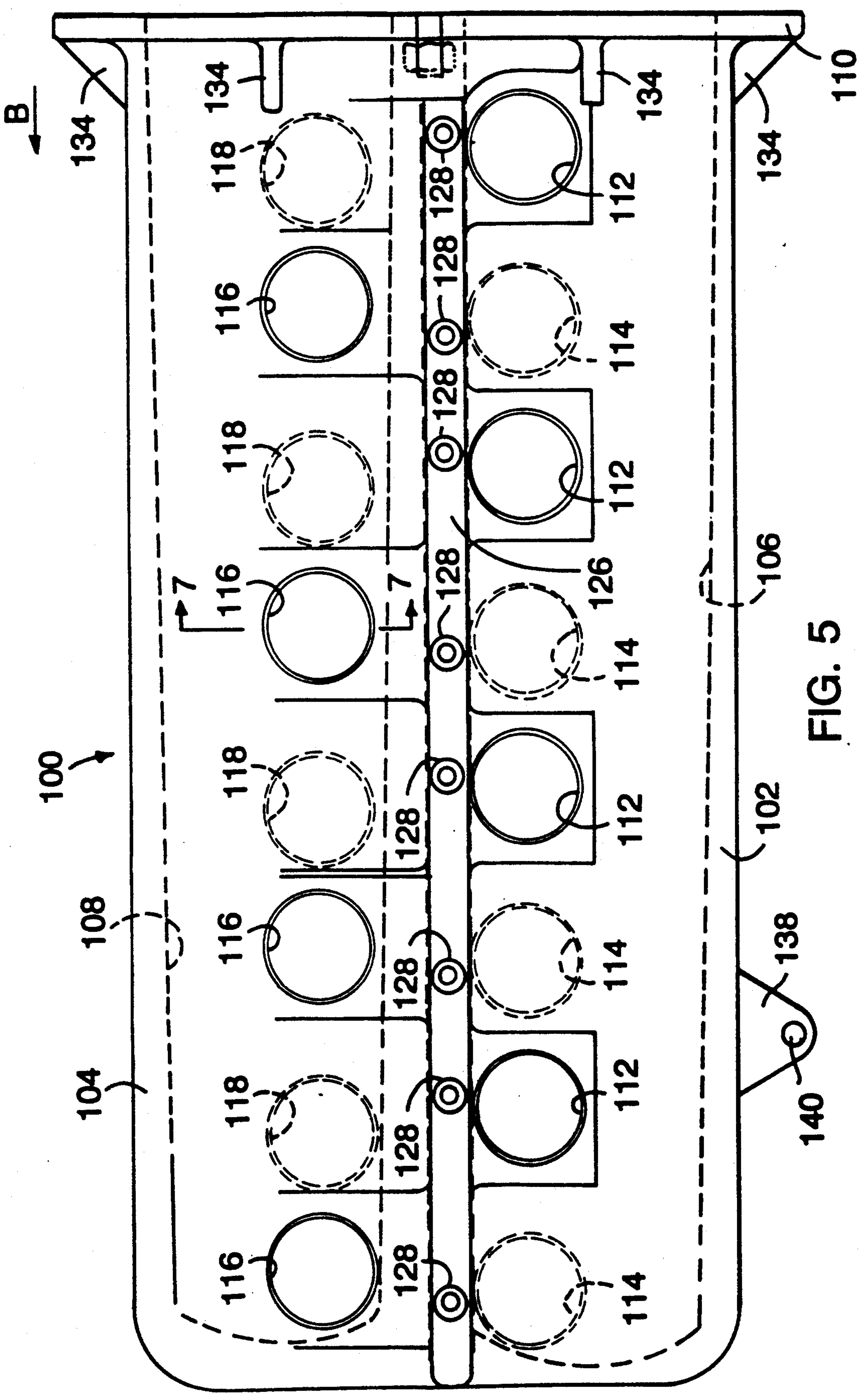
FIG. 5 is a side elevational view of a molded feed and accept manifold which is attachable to the main portion of the conduit apparatus shown in FIG. 3.
Figure 6:
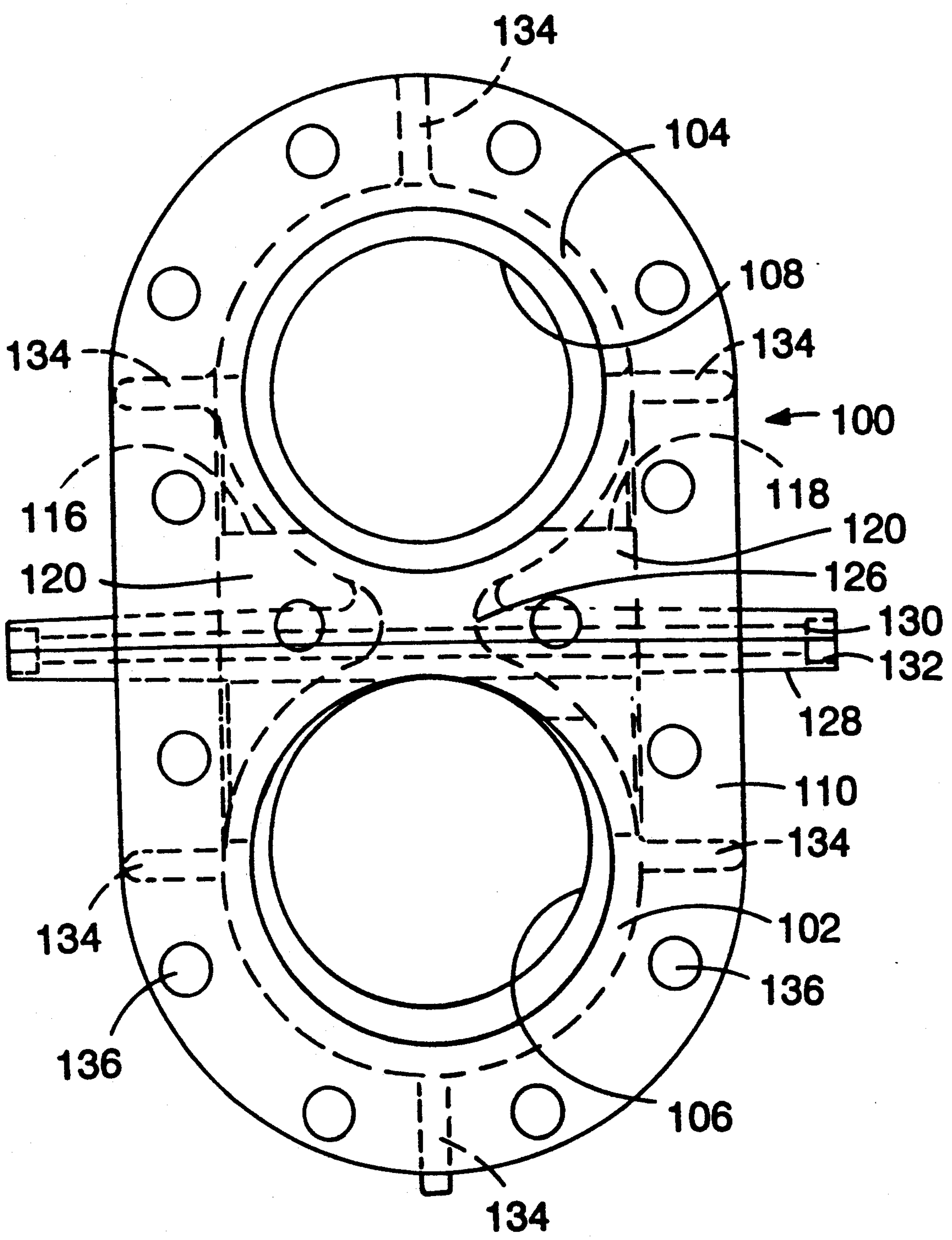
FIG. 6 is an end view of FIG. 5 taken in the direction of arrow B, illustrating the common flange which contacts the molded feed portion and the molded accept portion.

FIGS. 5–6 illustrate the molded polymeric feed and accept manifold 100 which is connected to the connecting flanges 76, 78 and 80 attached to the main feed and accept conduits 52 and 54. The molded manifold 100 includes a feed portion 102 and an accept portion 104. The feed portion 102 defines a feed cavity 106 which may have an inside diameter such that the cross-sectional area changes along its length to provide constant flow velocity for the material in the feed cavity. This change in cross sectional area may also assist in manufacture. The accept portion 104 includes an accept cavity 108 which also may also have a cross sectional area that changes along its length. Both the feed cavity 106 and the accept cavity 108 have a round cross section for reducing the stress acting on the walls of the cavities.

The feed cavity 106 includes a plurality of outlets 112 disposed on one side of the manifold 100 and additional outlets 114 disposed on the opposite side thereof. Similarly, the accept cavity 108 includes a plurality of inlets 116 disposed on one side of the molded manifold 100 and a plurality of inlets 118 disposed on the opposite side thereof. Each inlet/outlet pair 116, 112 and 118, 114 are designed to accept the nozzles from a hydrocyclone. The inlets 116, 118 are offset from the outlets 112, 114 because of the relative locations of the hydrocyclone nozzles.

Figure 7:
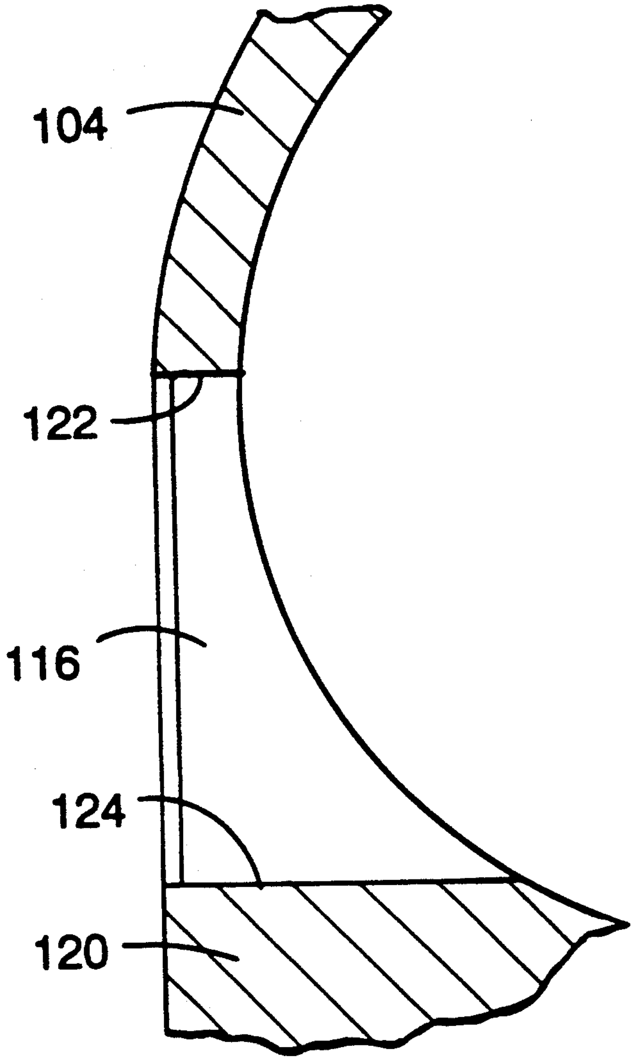
FIG. 7 is an enlarged cross sectional view taken along line 7—7 of FIG. 5, illustrating the inside surface of the aperture for receiving the sealing element of a nozzle of a hydrocyclone.

As can be seen in FIGS. 6 and 7, adjacent one side of the each inlet and outlet is a locally thickened region 120. The locally thickened region 120 forms a surface which can receive, in a manner similar to FIGS. 1 and 2, an O-ring disposed on a nozzle of the hydrocyclone. As can be clearly seen in FIG. 7, the outlet 116 includes an inner surface defining the aperture such that the length between the exterior and interior walls changes around the aperture. This can be clearly seen by reference numeral 122 where the length between the exterior and interior walls is shorter than the length shown by reference numeral 124. However, further embodiments of the invention could as easily allow a constant chamber wall thickness in the region of the inlet and outlet apertures, provided that an adequate sealing surface exists.

The feed portion 102 and the accept portion 104 are connected by connecting wall 126 so that the feed cavity 106 and the accept cavity 108 are separated by a common wall. Disposed along the length of the common wall 126 are supports 128. The supports include a through bore 130 for receiving a threaded rod so that the hydrocyclones can be supported along the manifold length. The supports 128 also include an enlarged region 132 of the through bore 130. This enlarged region is for receiving additional hardware therein.

The flange 110 which attaches to the main portion of the conduit apparatus includes ribs 134 which provide support and rigidity for the molded manifold 100. The flange 110 also includes a plurality of holes 136 which are provided to receive bolts for bolting the molded manifold to the connecting flanges on the main feed and accept conduits.

An extension 138 is provided which contains a bore 140 therein. The bore 140 is adapted to receive a supporting rod for supporting the molded reject conduits.

Figure 8:
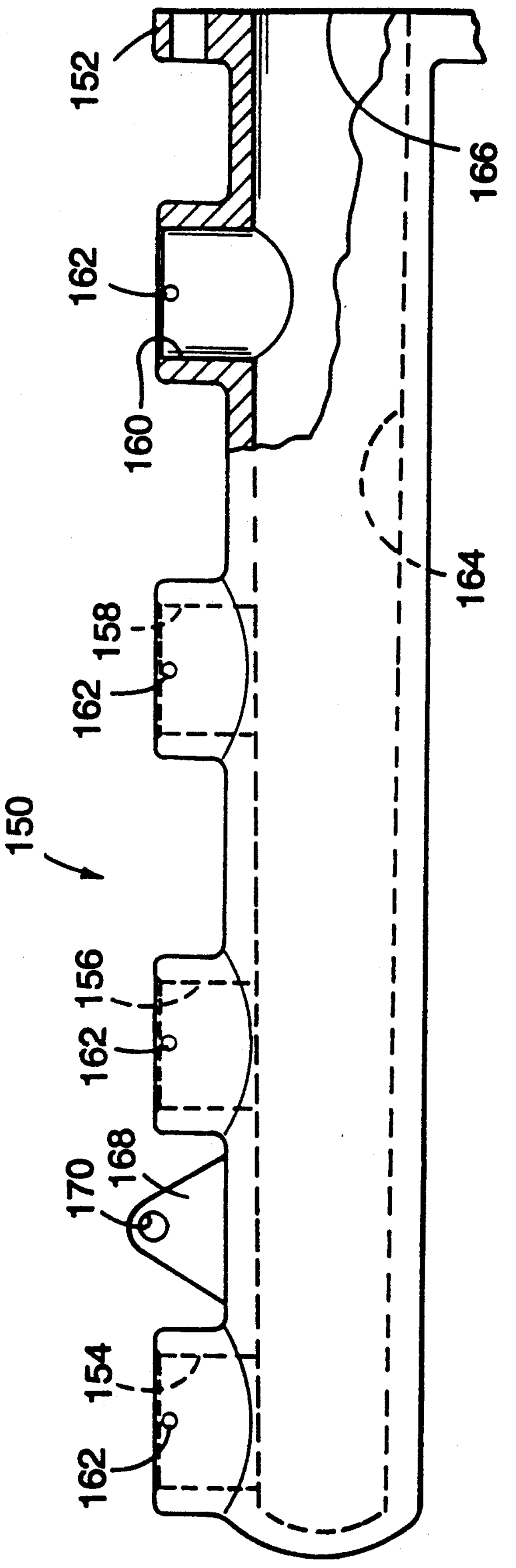
FIG. 8 is a side elevational view, partially in section, of a molded reject manifold which is attachable to the main reject conduit and to which the outlets of the hydrocyclones are attached.

FIG. 8 discloses a molded reject manifold 150. The molded reject manifold 150 includes a flange 152 for attaching to the connecting flanges such as connecting flange 84 disposed on the main reject conduit 56. As shown in FIG. 8, the molded reject manifold 150 is adapted to receive the outlets of four hydrocyclones. These outlet nozzles on the hydrocyclone are disposed in inlets 154, 156, 158 and 160. The rejected material is then fed to a main channel 164 and then to the single outlet 16 and then into the main reject conduit 56.

Each inlet includes a bore 162 provided therein. If it is desired to use less than four hydrocyclones for a particular application, an operator can remove the hydrocyclone and replace the nozzle of the hydrocyclone with a cap (not shown) which is sealingly engaged with the wall of the inlet and then a pin is disposed through the bore 162 and the cap. This thereby closes off this inlet of the reject manifold. A similar operation is performed on the molded feed/accept manifold. A block-off device, consisting of two connected caps can be installed in place of a hydrocyclone and retained by the hydrocyclone supports. The two caps seal off the appropriate inlet/outlet pair on the manifold.

The molded reject manifold 150 includes an extension 168 having a bore 170 therein. The bore 170 receives a support rod (not shown) which supports the molded reject manifold 150.

Figure 9:
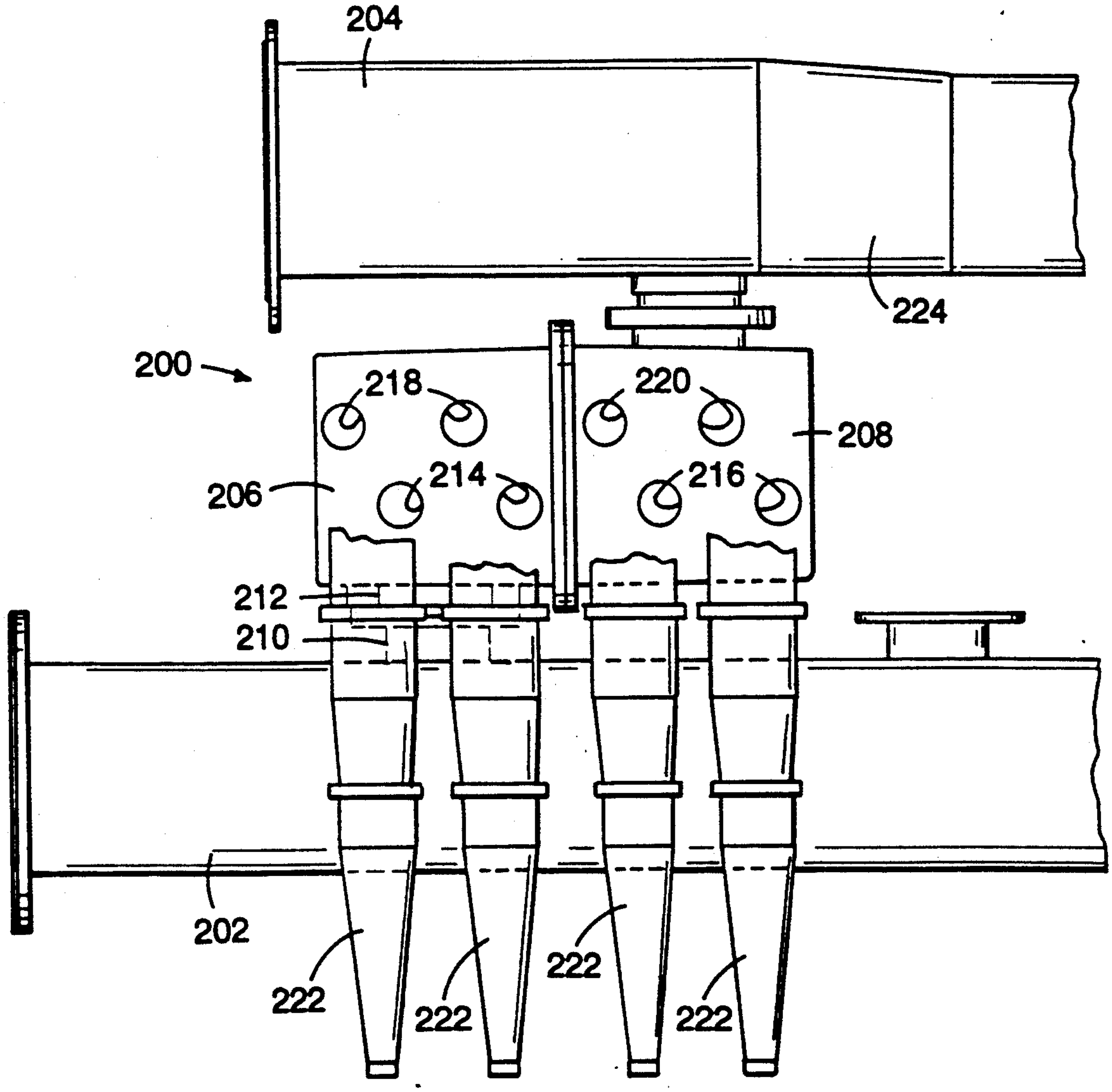
FIG. 9 is a side elevational view, partially broken away, of an in-line molded manifold attached to the main feed and main accept conduits according to another embodiment of the present invention.

FIG. 9 discloses another embodiment of the present invention which is referred to as the "in-line" system 200. The conduit apparatus 200 includes a main feed conduit 202 and a main accept conduit 204. Disposed in-line with the main feed and accept conduits are a plurality of molded manifolds 206, 208. The manifold 206 is similar to the molded manifold 100 except that two feed outlets 214 and two accept inlets 218 are disposed on either side of the manifold 206 instead of four as shown in manifold 100. The manifold 206 is connected via a connection 210 which is attached to the main feed conduit 202. The connection 210 is attached via a flange to a tube end flange 212 on the molded manifold 206.

Molded manifold 208 is identical or nearly identical to molded manifold 206 and is designed to be rotated 180° from the manifold 206. Molded manifold 208 includes a plurality of feed outlets 216 and accept inlets 220. The molded manifolds 206 and 208 are disposed such that their longitudinal axes are parallel with the longitudinal axes of the main feed and accept conduits 202 and 204. This is distinguished from the "branched-flow" system shown in FIGS. 3–8 wherein the longitudinal axes of the molded manifolds are disposed transverse to the longitudinal axes of the feed and accept conduits.

Disposed on either side of the molded manifolds 206, 208 as well as the main feed conduit 202 are a plurality of hydrocyclones 222. The hydrocyclones are shown broken away to illustrate the inlets and outlets on the manifolds. The reject outlets of the hydrocyclones are disposed in a pair of main reject conduits (not shown).

As can be seen clearly from FIG. 9, the molded manifolds 206 and 208 are connected to each other such that they have common feed and accept cavities. This requires that the manifolds have a symmetry such that when one manifold is rotated 180° from the other and they are connected as shown in FIG. 9, the feed and accept cavities match up to form common cavities.

Figure 12:
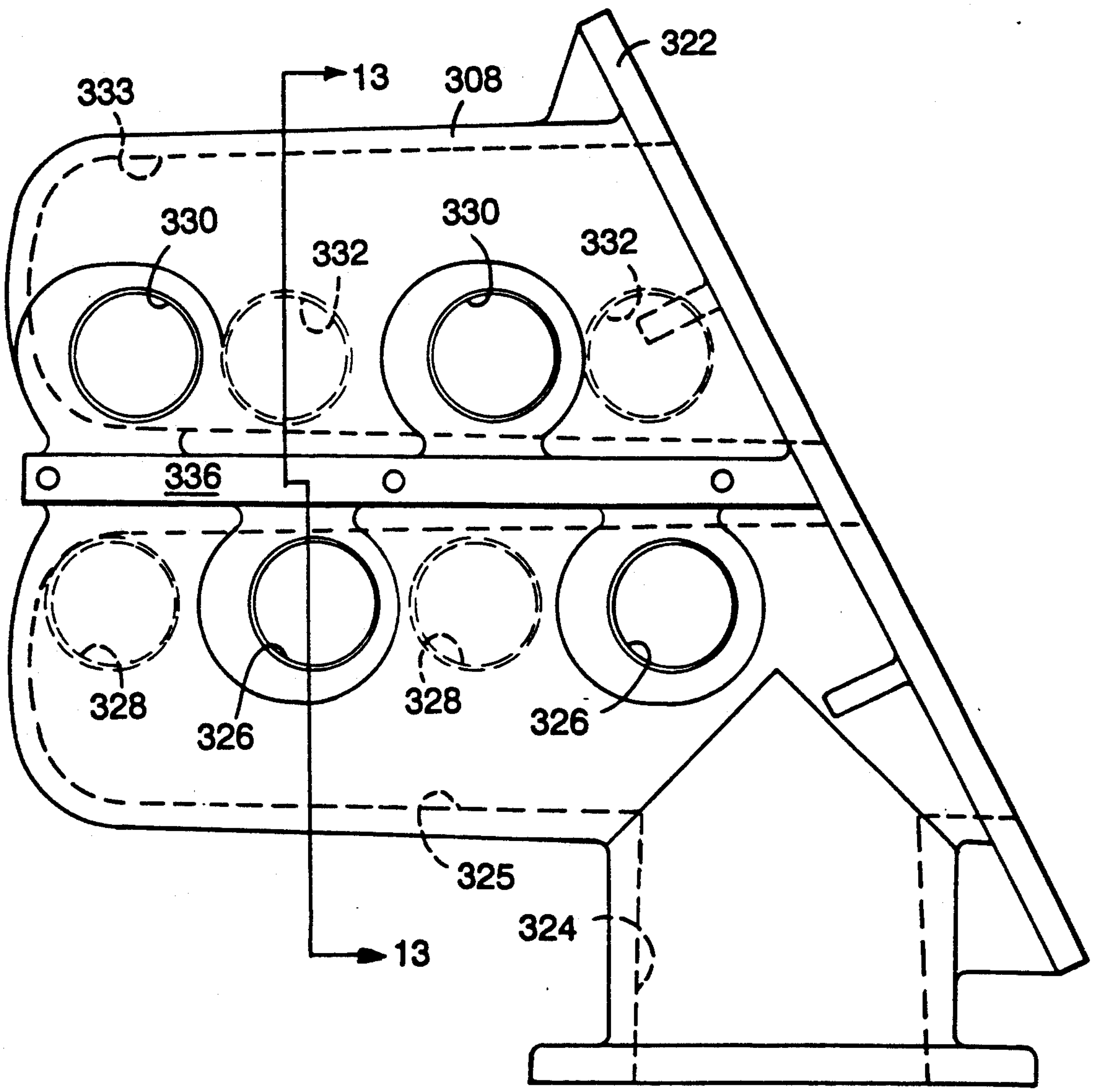
FIG. 12 is a side elevational view, rotated 180°, of the molded feed and accept manifold shown in FIG. 10.

It is not necessary that the shape of the common wall provided in in-line manifolds shown in FIGS. 9 and 12 be identical to that shown in FIG. 5. A common wall between the feed and accept cavities can also be provided which is wider than that shown in FIG. 5.

FIG. 9 also illustrates the main accept conduit having a reducer section 224. This reducer section 224 can be provided to assist a constant flow velocity through the main accept conduit. It is also noted that similar reducers can be used on the main feed conduit as well as the main reject conduit.

The in-line system provides a design that does not require separate reject manifolds to be disposed below the molded feed and accept manifolds, although a separate reject manifold may be useful in some applications.

It is also possible to substitute a plate for molded manifold 208 such that the plate includes an opening with a conduit to connect to the main accept conduit 204. This allows the use of only four hydrocyclones at a particular location which may be advantageous especially at the end of the main feed and accept conduits where space is limited.

Use of a manifold with only four hydrocyclones also provides more flexibility in system sizing since the number of hydrocyclone positions may be configured as a multiple of four rather than as a multiple of eight as would be necessary with only pairs of manifolds.

Figure 10:
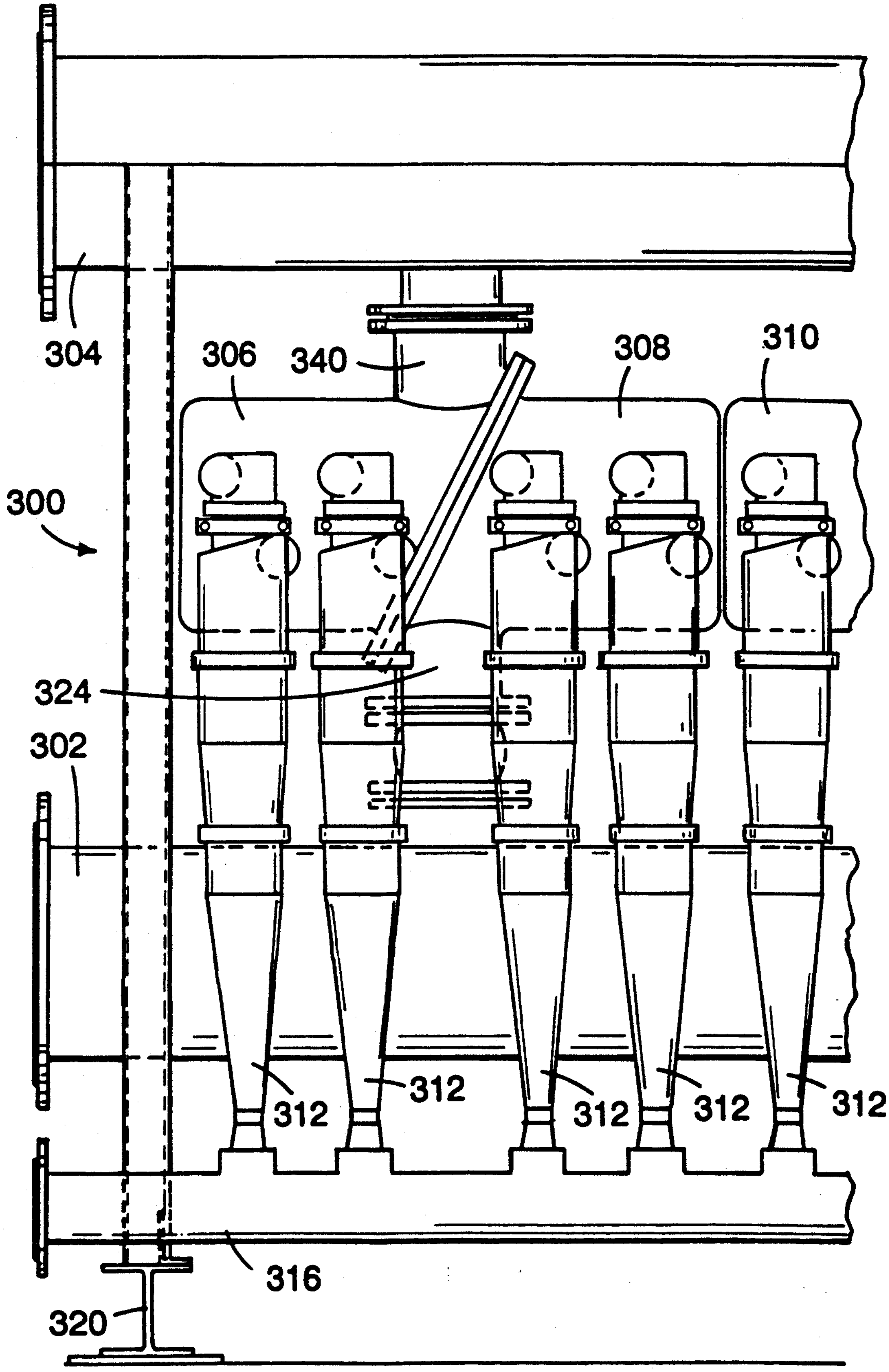
FIG. 10 is a side elevational view of a portion of another in-line molded manifold attached to the main feed and main accept conduits according to a further embodiment of the present invention.
Figure 11:
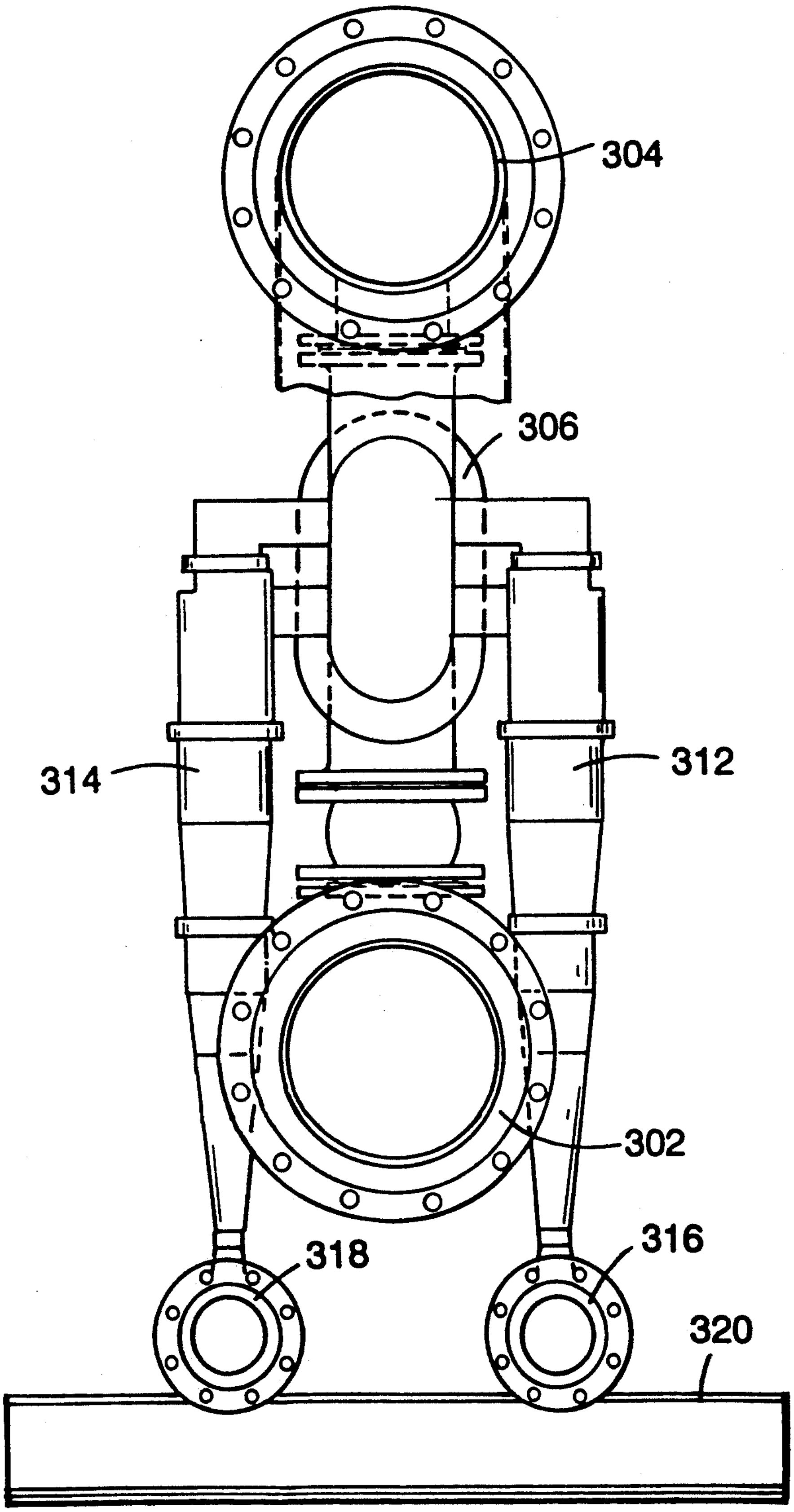
FIG. 11 is an end view, partially broken away, of the apparatus of FIG. 10.

FIGS. 10 and 11 disclose another embodiment of the in-line system according to the present invention. Specifically, a conduit apparatus 300 includes a main feed conduit 302 and a main accept conduit 304. Disposed in-line with the main feed and accept conduits are a plurality of molded manifolds 306, 308, 310. The manifolds 306, 308 and 310 are similar to manifold 206 in many respects. The main difference is that the connection between manifolds 206 and 208 is along a flange which is skewed relative to the axis of the manifolds. Although this is not necessary, it does allow the connections 324 and 340 to be nearly lined up. This permits the hydrostatic loads acting across these connections to be more efficiently reacted.

Disposed between feed conduit 302 and connection 324 is an expansion joint which accommodates any misalignment between these two members.

Figure 13:
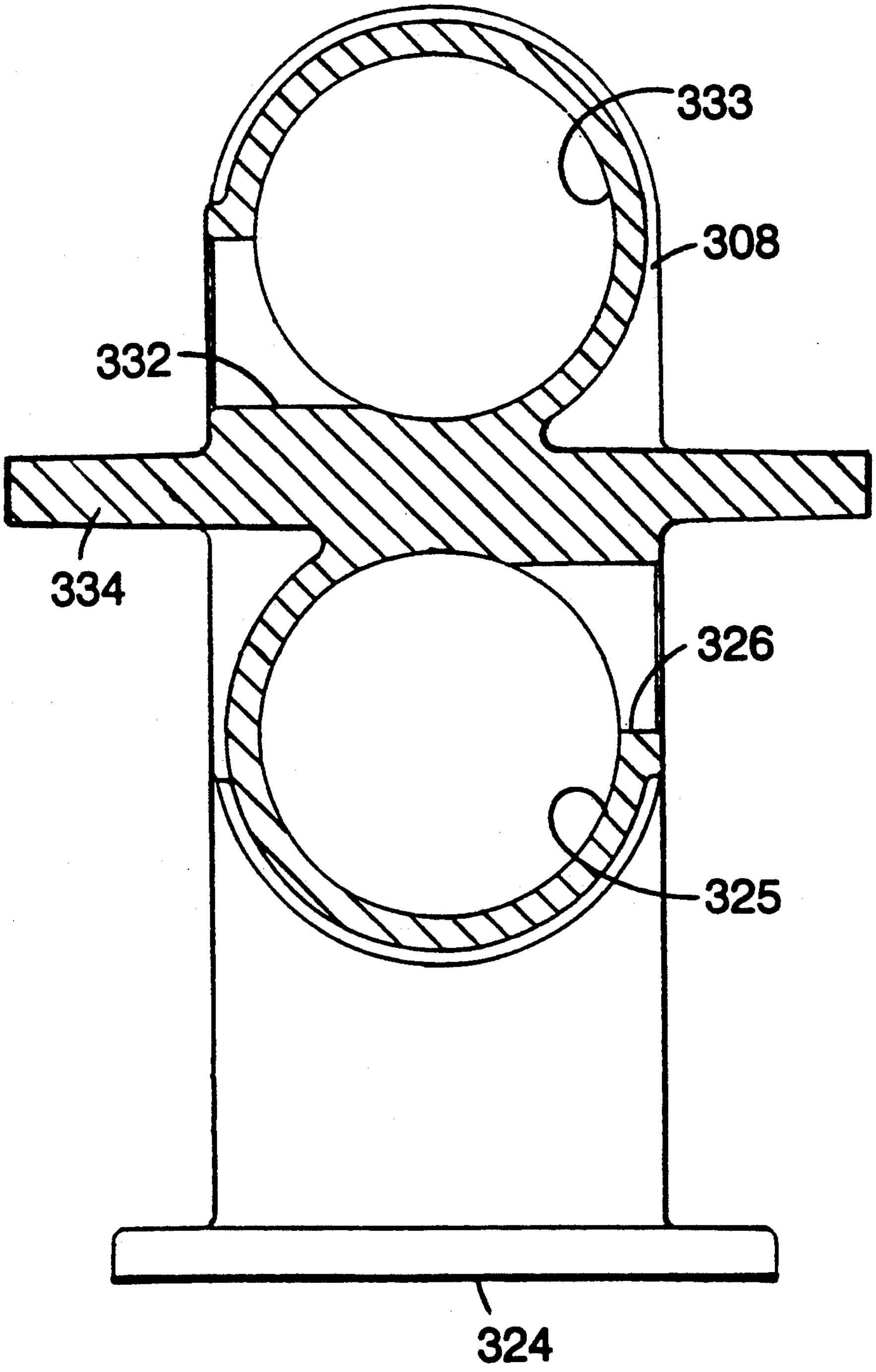
FIG. 13 is a cross-sectional view of the molded manifold taken along line 13—13 in FIG. 12; the angled flange and gussets are not shown for sake of clarity.

FIGS. 12 and 13 show the details of molded manifold 308. The operation of the conduit apparatus is now described in conjunction with FIGS. 10–13. Flow proceeds through the main feed conduit 302 and goes into an inlet 324 in the molded manifold 308. The flow then enters feed cavity 325 and also enters the feed cavity associated with manifold 306. It then exits the feed cavities by outlets 326, 328 (and similar outlets in the manifold 306) and enters the hydrocyclones 312, 314 where it is separated. The rejected portion exits the bottom of the hydrocyclones into reject conduits 316, 318. The accepted portion enters the accept inlets 330, 332 (and similar inlets in the manifold 306). The accepted flow then enters the accept cavity 333 and flows into the main accept conduit 304 by the main outlet in manifold 306.

As shown in FIG. 13, the molded manifold 308 includes a support 336 which is similar to the one described in connection with FIGS. 5 and 6.

While FIG. 10 illustrates two manifolds attached together 306, 308 and one manifold 310 being partially shown, it is to be understood that any number of pairs of manifolds is possible in the in-line system only being limited by the space of the manufacturing facility. It is also to be understood that it is possible to only have one manifold which feeds four hydrocyclones at the end of the conduit apparatus. The angled flange would then be matched to another flange which had a single conduit that could supply flow from the accept manifold to the main accept conduit.

Other embodiments are within the following claims.

We claim:

1. A manifold for connecting a plurality of hydrocyclones to feed and accept conduits, said manifold comprising a hydrocyclone feeding and accepting molded polymeric member, said molded member including a feed cavity configured to transport feed materials from the feed conduit to the plurality of hydrocyclones, said feed cavity including an inlet and a plurality of outlets; and an accept cavity configured to transport accept materials from the plurality of hydrocyclones to the accept conduits, said accept cavity including a plurality of inlets and an outlet, and wherein said outlets of said feed cavity and said inlets of said accept cavity are separated from each other so that flow of said feed materials from said feed cavity directly into said accept cavity is prevented.

2. The manifold as defined in claim 1, wherein at least one of said feed cavity and said accept cavity has a cross-sectional area that varies along the length of the cavity.

3. The manifold as defined in claim 2, wherein said varying cross-sectional area is largest at the inlet end of the cavity and reduces progressively toward the other end of the cavity.

4. The manifold as defined in claim 2, wherein said varying cross-sectional area is largest at the outlet end of the cavity and reduces progressively toward the other end of the cavity.

5. The manifold as defined in claim 1 wherein said molded member includes at least one flange for connecting said manifold to said feed and accept conduits.

6. The manifold as defined in claim 1, wherein said polymeric material is primarily glass-reinforced nylon.

7. The manifold as defined in claim 1, wherein at least one of said feed cavity and said accept cavity has a round ross-section.

8. The manifold as defined in claim 1, wherein said feed cavity and said accept cavity are separated by a common wall.

9. The manifold as defined in claim 1, wherein said accept cavity is defined by an exterior wall containing openings defining said plurality of inlets therein, each said opening sized and configured for attachment of an accept nozzle of a said hydrocyclone.

10. The manifold as defined in claim 9, wherein said feed cavity is defined by an exterior wall containing openings defining said plurality of outlets therein, each said opening sized and configured for attachment of a feed nozzle of a said hydrocyclone.

11. Apparatus for separating material comprising:

a main feed conduit having an inlet and a plurality of outlets;

a main accept conduit having a plurality of inlets and an outlet;

a main reject conduit having a plurality of inlets and an outlet;

a plurality of hydrocyclones, each of said plurality of hydrocyclones having an inlet and a plurality of outlets with one of said outlets being connected to said main reject conduit; and a molded manifold for connecting said plurality of hydrocyclones to said main feed and said main accept conduits, said molded manifold comprising a molded polymeric member, said molded member including a feed cavity configured to transport feed materials from the feed conduit to the plurality of hydrocyclones, said feed cavity including an inlet and a plurality of outlets; and an accept cavity configured to transport accept materials from the plurality of hydrocyclones to the accept conduits, said accept cavity including a plurality of inlets and an outlet.

12. The apparatus as defined in claim 1, wherein said apparatus includes two molded manifolds that are attached to each other so that (1) the feed cavities of the connected manifolds form a common feed cavity and (2) the accept cavities of the connected manifolds form a common accept cavity.

13. The apparatus as defined in claim 12, wherein said molded manifolds each include a connecting flange which is angled to a longitudinal axis of the manifold.

14. The apparatus as defined in claim 1, wherein said feed cavity and said accept cavity are separated by a common wall.

15. The apparatus as defined in claims 1, wherein said accept cavity is defined by an exterior wall containing openings defining said plurality of inlets therein, each said opening sized and configured for attachment of an accept nozzle of a said hydrocyclone.

16. The apparatus as defined in claim 15, wherein said feed cavity is defined by an exterior wall containing openings defining said plurality of outlets therein, each said opening sized and configured for attachment of a feed nozzle of a said hydrocyclone.

17. The apparatus as defined in claim 11, wherein each of said plurality of hydrocyclones includes a nozzle having a resilient sealing member disposed around its circumference and the resilient sealing member seals against a cylindrical sealing portion of an inside surface of an aperture formed in a wall of said molded manifold.

18. An apparatus as defined in claim 17, wherein said aperture defines a surface having a cylindrical sealing portion against which said resilient member can seal.

19. An apparatus as defined in claim 1, wherein said main accept conduit, said main feed conduit, and said molded manifold each have a longitudinal axis, and said main feed conduit, said main accept conduit, and said molded manifold are disposed so that the longitudinal axis of said molded manifold is transversely disposed relative to the longitudinal axes of said main feed conduit and said main accept conduit.

20. An apparatus as defined in claim 1, wherein said main accept conduit, said main feed conduit, and said molded manifold each have a longitudinal axis, and said main feed conduit, said main accept conduit, and said molded manifold are disposed so that the longitudinal axis of said molded manifold is parallel with the longitudinal axes of said main feed conduit and said main accept conduit.

21. The apparatus as defined in claim 11, wherein at least one of said feed cavity and said accept cavity has a cross-sectional area that varies along the length of the cavity.

22. The apparatus as defined in claim 21, wherein said varying cross-sectional area is largest at the inlet end of the cavity and reduces progressively toward the other end of the cavity.

23. The apparatus as defined in claim 21, wherein said varying cross-sectional area is largest at the outlet end of the cavity and reduces progressively toward the other end of the cavity.

24. The apparatus as defined in claim 11, wherein said molded member includes at least one flange for connecting said manifold to said feed and accept conduits.

25. The apparatus as defined in claim 11, wherein said polymeric material is primarily glass-reinforced nylon.

26. An apparatus for separating material comprising:

a plurality of hydrocyclones, each of said plurality of hydrocyclones having an inlet and a plurality of outlets with one of said outlets being connected to a main reject conduit; and a manifold for connecting a plurality of hydrocyclones to feed and accept conduits, said manifold comprising:

a feed portion defining a feed cavity configured to transport feed materials form the feed conduit to the plurality of hydrocyclones, said feed cavity including an inlet and a plurality of outlets, said feed portion including a first wall extending in a longitudinal direction of said feed cavity;

an accept portion defining an accept cavity configured to transport accept materials form the plurality of hydrocyclones to the accept conduits, said accept cavity including a plurality of inlets and an outlet, said accept portion including a second wall extending in a longitudinal direction of said accept cavity; and wherein each of said plurality of hydrocyclones includes a nozzle having a resilient sealing member disposed around its circumference and the resilient sealing member seals against a cylindrical sealing portion of an inside surface of an aperture formed in at least one of said first and second walls.

27. The apparatus as defined in claim 26, wherein the main reject conduit is disposed so that each said hydrocyclone can be tilted to bring the resilient sealing member of the nozzle into sealing engagement with said cylindrical sealing portion of the aperture in said manifold.

28. The apparatus as defined in claim 26, wherein said manifold is formed to include a smooth metal member which is bent into shape.

29. The apparatus as defined in claim 26, wherein said aperture has a diameter, wherein said inside surface of said aperture has a length along the direction of flow through said aperture, and wherein said length is less than said diameter.

30. The apparatus as defined in claim 26, wherein each of said plurality of hydrocyclones includes a pair of nozzles, each of said nozzles having a resilient sealing member disposed around its circumference and the resilient sealing member seals against a cylindrical sealing portion of an inside surface of one of a pair of apertures formed in at least one of said first and second walls.

31. The apparatus as defined in claim 30, wherein each of said apertures has a diameter, wherein said inside surface of said aperture has a length along the direction of flow through said aperture, and wherein said length is less than said diameter.

32. An apparatus for separating material comprising:

a feed conduit having an inlet and a plurality of feed outlets;

an accepts conduit having a plurality of accept inlets and an outlet;

a plurality of hydrocyclones, each said hydrocyclone having a feed inlet, a rejects outlet, and an accepts outlet, said rejects outlet being removably connected to a main reject conduit; and a manifold operatively connecting a plurality of said hydrocyclones to said feed and accept conduits, said manifold being disposed substantially entirely between a longitudinal axis of said feed conduit and a longitudinal axis of said accept conduit, said manifold having at least one feed inlet configured to be removably connected to a said feed outlet of said feed conduit, said manifold having at least one accepts outlet configured to be removably connected to a said accepts inlet of said accepts conduit, and said manifold having a plurality of hydrocyclone feed outlets and accepts inlets structured and arranged to removably receive said feed inlets and said accepts outlets of each said hydrocyclone.

33. An apparatus as defined in claim 32, wherein said manifold comprises:

a feed portion defining a feed cavity configured to transport feed materials from said feed conduit to said plurality of hydrocyclones, said feed cavity including an inlet and a plurality of outlets; and an accept portion defining an accept cavity configured to transport accept materials from said plurality of hydrocyclones to said accept conduits, said accept cavity including a plurality of inlets and an outlet.

34. An apparatus as defined in claim 32, wherein said manifold is disposed above said feed conduit and below said accept conduit.

35. An apparatus as defined in claim 32, wherein said manifold is a molded polymeric member.

36. An apparatus as defined in claim 32, wherein each of said plurality of hydrocyclones includes a nozzle having a resilient sealing member disposed around its circumference and the resilient sealing member seals against a cylindrical sealing portion of an inside surface of an aperture formed in a wall of said manifold.

* * * * *

UNITED STATES PATENT AND TRADEMARK OFFICE
CERTIFICATE OF CORRECTION

PATENT NO. : 5,221,476

DATED : June 22, 1993

INVENTOR(S) : Richard R. Papetti, James D. Livsey and Ernest J. Charette

It is certified that error appears in the above-identified patent and that said Letters Patent is hereby corrected as shown below:

Column 1, line 8, "Jul" should be --July--.

Column 2, line 46, after "sections", insert --.--.

Column 3, line 67, "1;" should be --11--.

Column 4, line 45, "tiled" should be --tilted--.

Column 4, lines 54-55, "embodimetn" should be --embodiment--.

Column 6, line 32, "16" should be --166--.

Column 8, line 65, "ross-section" should be --cross-section--.

Column 9, line 35, "claim 1" should be --claim 2--.

Column 9, line 44, "claim 1" should be --claim 2--.

Column 9, line 47, "claims 1" should be --claim 2--.

UNITED STATES PATENT AND TRADEMARK OFFICE
CERTIFICATE OF CORRECTION

PATENT NO. : 5,221,476

DATED : June 22, 1993

INVENTOR(S) : Richard R. Papetti, James D. Livsey and Ernest J. Charette

It is certified that error appears in the above-identified patent and that said Letters Patent is hereby corrected as shown below:

Column 9, line 66, "claim 1" should be --claim 2--.

Column 10, line 6, "claim 1" should be --claim 2--.

Column 10, line 46, "form" should be --from--.

Signed and Sealed this

Thirtieth Day of August, 1994

Attest:

BRUCE LEHMAN

*Attesting Officer*

*Commissioner of Patents and Trademarks*